United States Patent
Shieh et al.

(10) Patent No.: US 7,791,990 B2
(45) Date of Patent: Sep. 7, 2010

(54) DATA BUFFERING METHOD USED WHEN PERFORMING READ OPERATION ON OPTICAL STORAGE MEDIUM

(75) Inventors: Jia-Horng Shieh, Taipei County (TW); Jin-Bin Yang, Changhua County (TW)

(73) Assignee: MediaTek Inc., Science-Based Industrial Park, Hsin-Chu (TW)

( * ) Notice: Subject to any disclaimer, the term of this patent is extended or adjusted under 35 U.S.C. 154(b) by 987 days.

(21) Appl. No.: 11/532,102

(22) Filed: Sep. 15, 2006

(65) Prior Publication Data

US 2007/0104040 A1     May 10, 2007

(30) Foreign Application Priority Data

Nov. 9, 2005   (TW)   .............. 94139263 A

(51) Int. Cl.
*G11B 5/09* (2006.01)
(52) U.S. Cl. .................................... 369/47.1
(58) Field of Classification Search ............ 369/30.23, 369/47.34
See application file for complete search history.

(56) References Cited

U.S. PATENT DOCUMENTS

| 4,800,452 | A | * | 1/1989 | Ishii ..................... 360/78.14 |
| 4,800,524 | A | * | 1/1989 | Roesgen ................ 711/217 |
| 4,939,712 | A | * | 7/1990 | Abe et al. .............. 369/30.16 |
| 5,402,399 | A | * | 3/1995 | Oshiba et al. .......... 369/30.23 |
| 7,061,850 | B1 |  | 6/2006 | Irie |
| 2004/0047251 | A1 |  | 3/2004 | Minamino |

FOREIGN PATENT DOCUMENTS

TW              470946           1/2002

* cited by examiner

*Primary Examiner*—Hoa T Nguyen
*Assistant Examiner*—Mark L Fischer
(74) *Attorney, Agent, or Firm*—Winston Hsu

(57) ABSTRACT

A data buffering method used when performing a read operation on an optical storage medium is disclosed. After a first data unit having an unidentifiable and temporarily undeducible ID address is reproduced through the read operation, the method starts storing the first data unit and subsequently reproduced data units into a buffer memory in turn. After a second ID address of a second data unit of the subsequently reproduced data units is identified, the method deduces a target memory address of the buffer memory according to the second ID address and a target ID address. A buffer start pointer is then set according to the deduced target memory address.

20 Claims, 12 Drawing Sheets

DATA BUFFERING METHOD USED WHEN PERFORMING READ OPERATION ON OPTICAL STORAGE MEDIUM

BACKGROUND

The embodiments relate to optical storage media, and more particularly, to a data buffering method used when performing a read operation on an optical storage medium.

Optical storage media, such as optical discs, are popular storage media frequently used in daily life. An optical disc drive having a buffer memory set therein is a device that reproduces data stored in optical discs. Specifically, the optical disc drive first stores data reproduced through reading the optical disc into the buffer memory, then the optical disc drive or an external host can utilize the data stored in the buffer memory.

In the related art, when performing a read operation on an optical disc, the optical disc drive starts storing reproduced data units into the buffer memory only after it ascertains the ID addresses of the reproduced data units. More specifically, only after the optical disc drive ascertains that the ID address of a currently reproduced data unit matches a target ID address will the optical disc drive start storing the currently reproduced data unit and subsequently reproduced data units into the buffer memory.

FIG. 1 to FIG. 3 illustrate how data units are stored into the buffer memory when the optical disc drive of the related art performs a read operation on an optical disc. In these figures, the optical disc drive tries to match the ID address of each reproduced data unit with a target ID address Target_ID. If the optical disc drive finds that the ID address of a currently reproduced data unit matches Target_ID, it treats the currently reproduced data unit as a target data unit and starts storing the currently reproduced data unit and subsequently reproduced data units into the buffer memory.

In FIG. 1, each of the reproduced data units has an identifiable ID address. The optical disc drive reproduces the data units with ID addresses N−3, N−2, N−1, N, N+1 . . . in turn. When the optical disc drive reproduces the data unit with ID address N, it recognizes that N matches Target_ID and therefore treats the currently reproduced data unit as the target data unit. The optical disc drive starts storing the currently reproduced data unit having ID address N and subsequently reproduced data units into the buffer memory.

In FIG. 2, a data unit ought to be treated as the target data unit has an unidentifiable ID address X. However, due to the ID addresses of the data units ahead of the target data unit, when the data unit with ID address X is reproduced, the optical disc drive can still deduce that X equals N and conclude that X matches Target_ID. Therefore, the optical disc drive correctly treats the currently reproduced data unit as the target data unit and starts storing it and subsequently reproduced data units into the buffer memory.

Under the situations shown in FIG. 1 and FIG. 2, the optical disc drive functions well since it correctly identifies or deduces the ID address of the data unit ought to be treated as the target data unit and therefore starts storing data units into the buffer memory from the correct data unit. Sometimes, however, not only the ID address of the target data unit is unidentifiable, but the ID addresses of the data units ahead of the target data unit are also unidentifiable. In such circumstances, when the optical disc drive reproduces the target data unit, it is not able to identify or deduce the ID address of the target data unit and will not start buffering. Only after the optical disc drive identifies the ID address of a data unit behind the target data unit can the optical disc drive backwardly deduce the ID addresses of already passed data units and reproduce the data unit having a deduced ID address that matches the target ID address again, in order to start buffering.

As shown in FIG. 3, a data unit ought to be treated as the target data unit has an unidentifiable ID address X. Since the data unit with ID address X is immediately adjacent to a blank section, the optical disc drive cannot deduce the exact value of X instantly after reproducing the data unit. Therefore, the optical disc drive will not store the data unit with ID address X into the buffer memory when reproducing the data unit for the first time. Only after the optical disc drive has reproduced the data units with ID addresses larger then N can it conclude that the data unit ought to be treated as the target data unit has been passed already. The optical disc drive then has to reproduce the data unit ought to be treated as the target data unit again, in order to start buffering.

For the optical disc drive of the related art, only after it ascertains that the ID address of a currently reproduced data unit matches the target ID address will the optical disc drive start buffering reproduced data units. When a data unit ought to be treated as the target data unit is reproduced but the optical disc drive fails to identify or deduce it's ID address, the optical disc drive will not start buffering. Extra time is wasted in reproducing data units for the second time if the optical disc drive fails to start buffering when the target data unit is reproduced for the first time.

SUMMARY OF THE INVENTION

A data buffering method used when performing a read operation on an optical storage medium is disclosed. After a first data unit having an unidentifiable and temporarily undeducible ID address is reproduced through the read operation, the method starts storing the first data unit and subsequently reproduced data units into a buffer memory in turn. After a second ID address of a second data unit of the subsequently reproduced data units is identified, the method deduces a target memory address of the buffer memory according to the second ID address and a target ID address. A buffer start pointer is then set according to the deduced target memory address.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
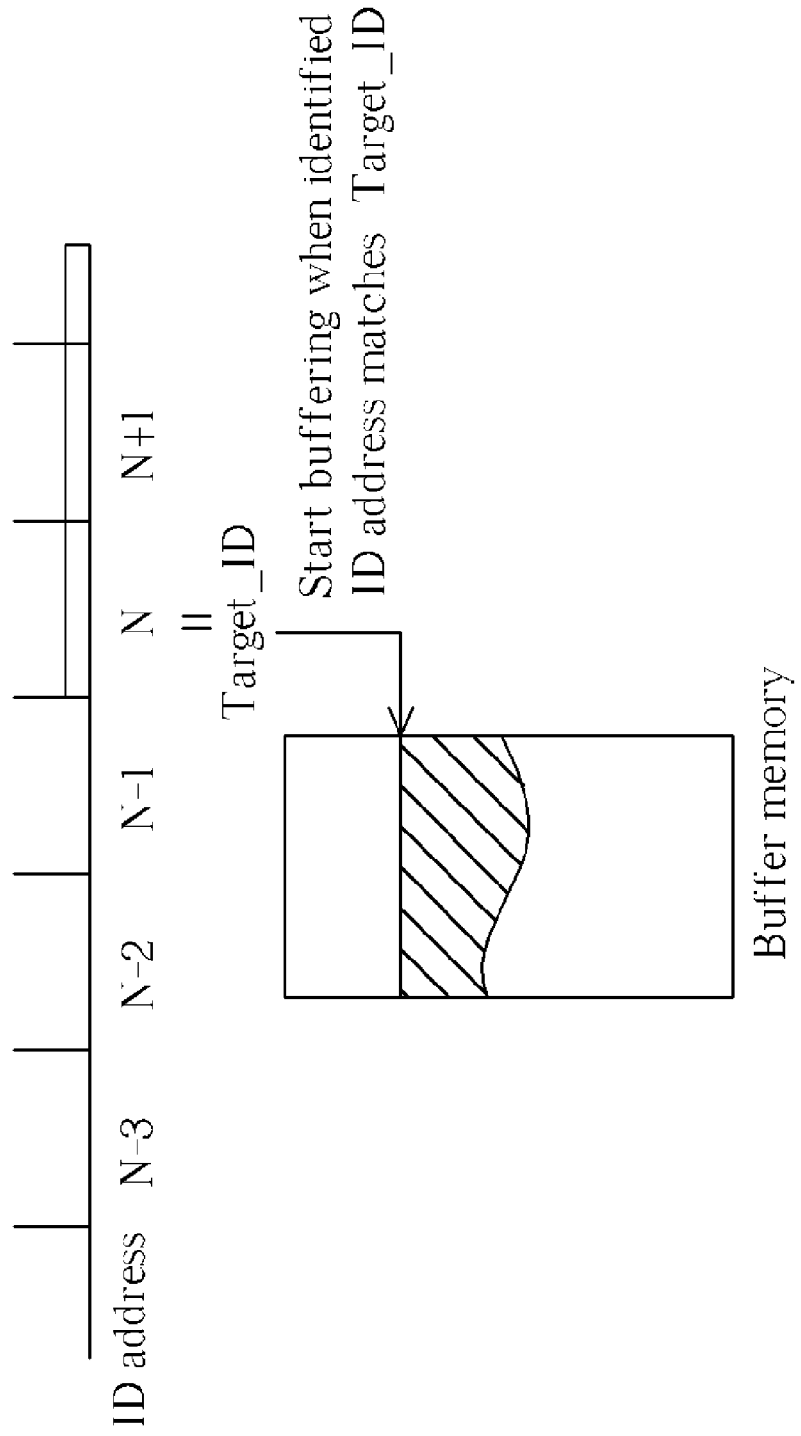
FIG. 1 to FIG. 3 show how data units are stored into a buffer memory when an optical disc drive of the related art performs read operation on an optical disc.
Figure 2:
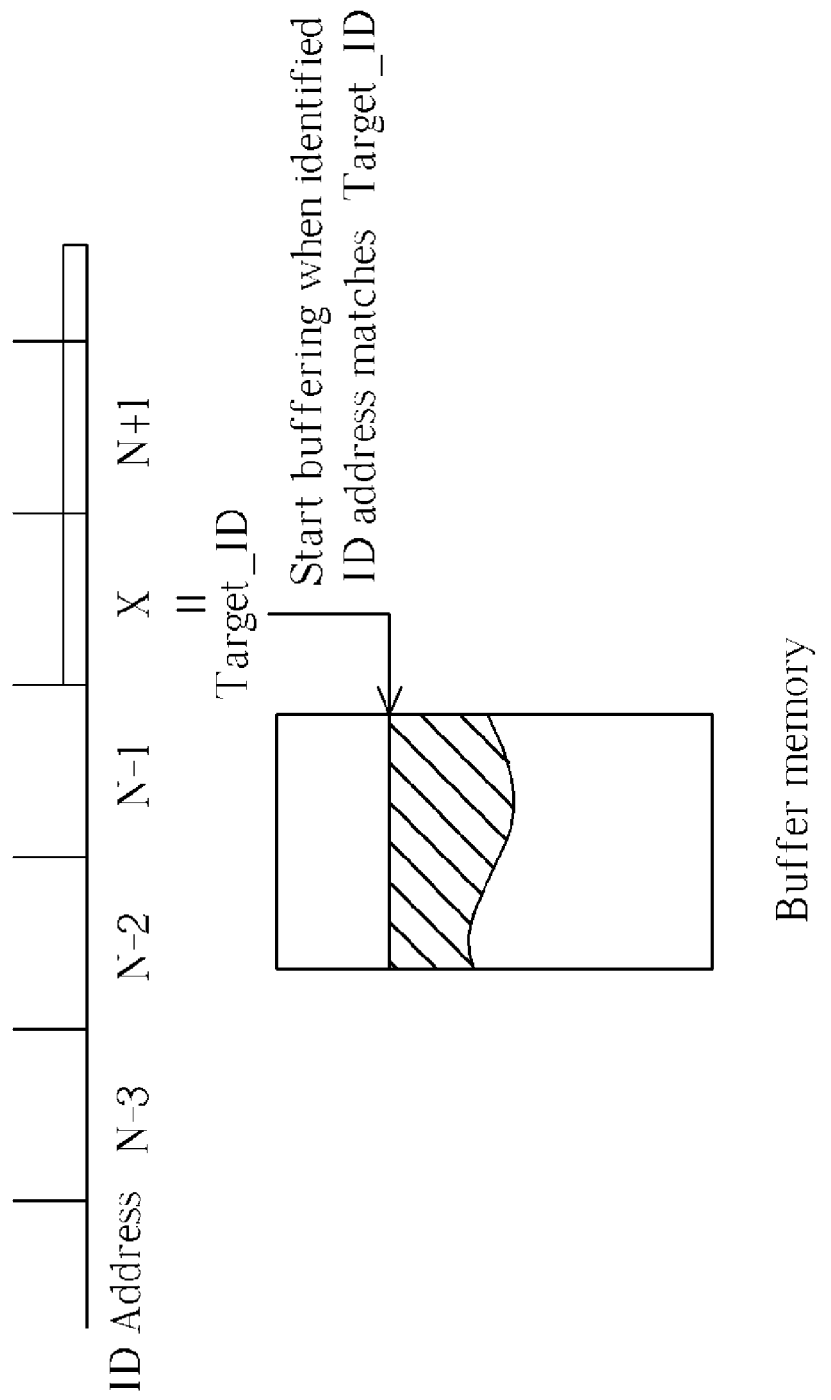
Figure 3:
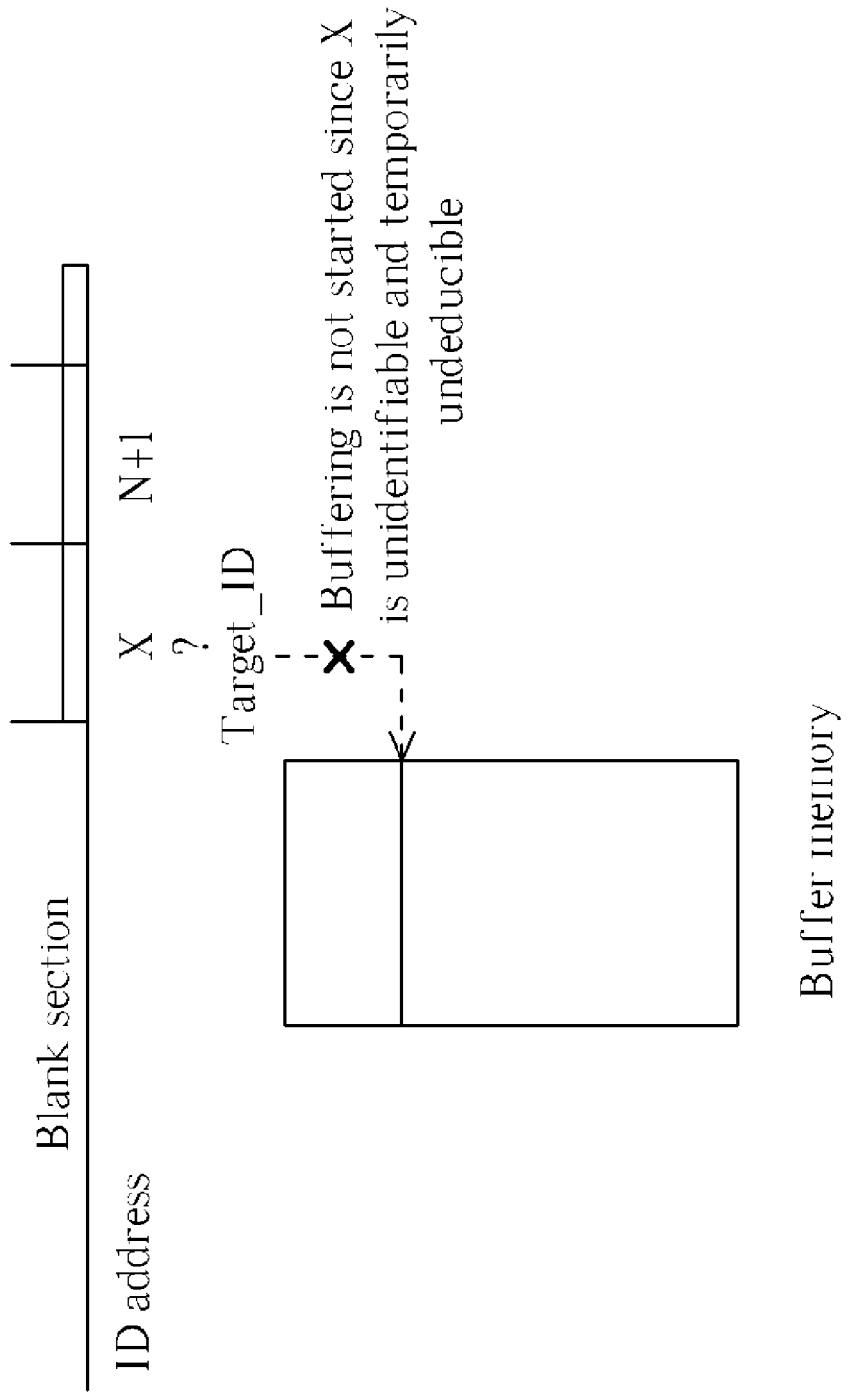
Figure 4:
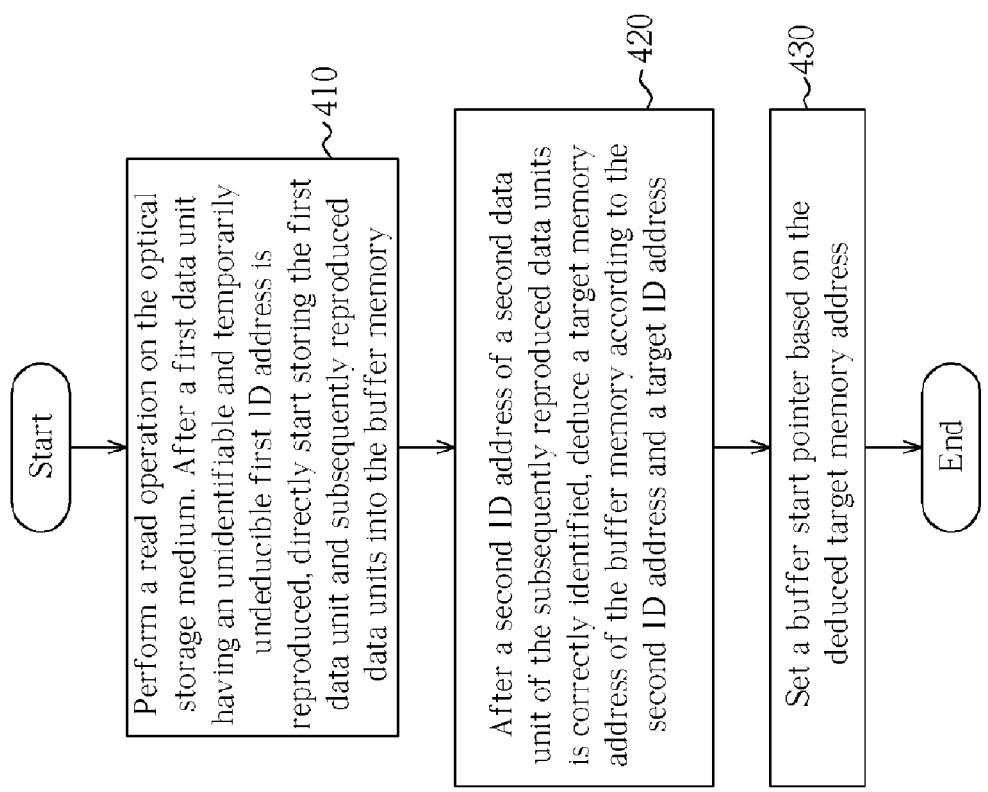
FIG. 4 shows an exemplary flowchart of the proposed data buffering method.
Figure 12:
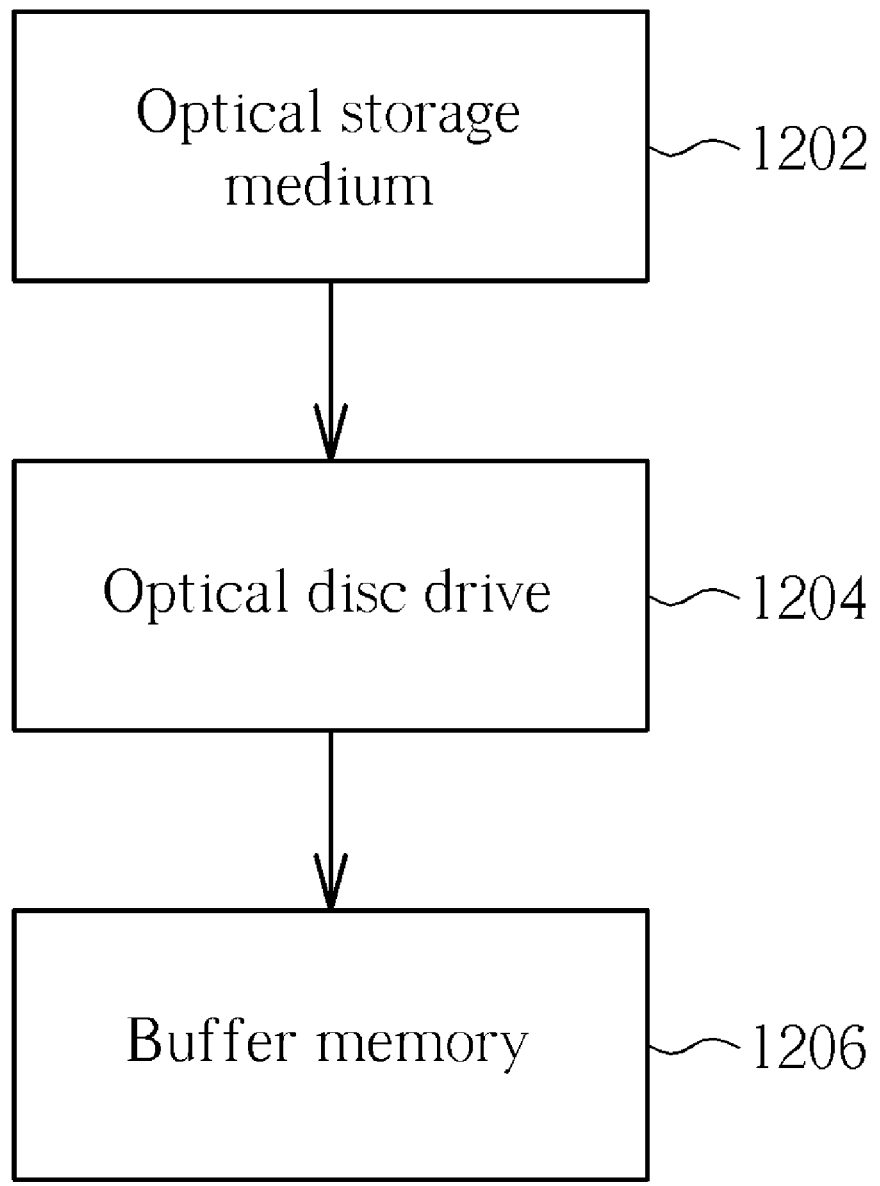
FIG. 12 is a diagram illustrating an optical disc drive which performs a read operation on an optical storage medium and stores reproduced data units into a buffer memory.

FIG. 4 shows an exemplary flowchart of the proposed data buffering method. The method allows an optical disc drive to store reproduced data units into a buffer memory when the optical disc drive performs a read operation on an optical storage medium. As shown in FIG. 12, an optical disc drive 1204 performs a read operation on an optical storage medium 1202 and stores reproduced data units into a buffer memory 1206. An optical disc, such as a Blu-ray disc, serves as an example of the aforementioned optical storage medium; and a dynamic random access memory (DRAM) serves as an example of the aforementioned buffer memory. The flowchart shown in FIG. 4 includes the following steps:

Step 410: Perform a read operation on the optical storage medium. After a first data unit having an unidentifiable and temporarily undeducible first ID address is reproduced, directly start storing the first data unit and subsequently reproduced data units into the buffer memory. For instance, the first data unit is a first reproduced data unit after a blank section is passed.

Step 420: After a second ID address of a second data unit of the subsequently reproduced data units is correctly identified, deduce a target memory address of the buffer memory according to the second ID address and a target ID address, where the target memory address corresponds to the target ID address. Assume that in step 410, the second data unit is stored in a second memory address of the buffer memory. In Step 420 the optical disc drive first subtracts the target ID address from the second ID address to get an ID address difference. Then the target memory address is obtained by subtracting a product of the ID address difference and a unit memory address length from the second memory address. The unit memory address length stands for a memory address length each data unit occupies in the buffer memory.

Step 430: Set a buffer start pointer based on the deduced target memory address. The buffer start pointer indicates where the data unit having the target ID address is stored in the buffer memory.

Figure 5:
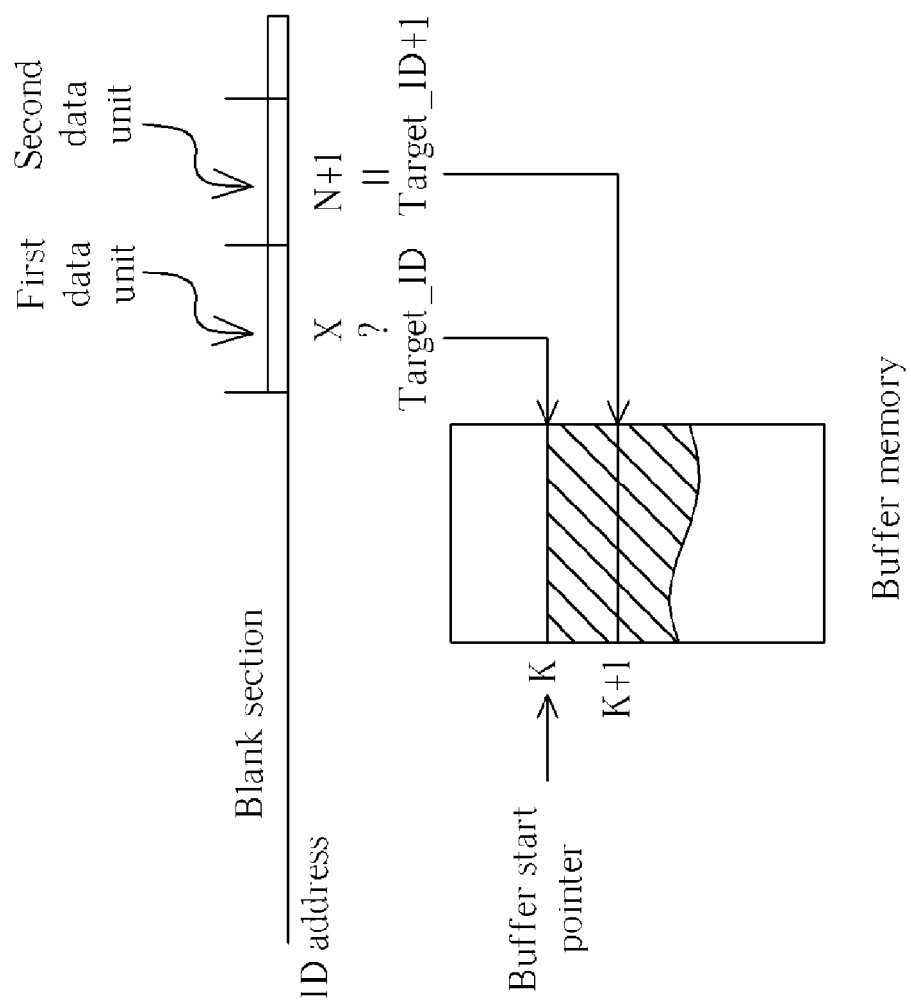
FIG. 5 to FIG. 11 illustrate how data units are stored into a buffer memory when an optical disc drive performs read operations on an optical disc according to the exemplary flowchart of FIG. 4.
Figure 6:
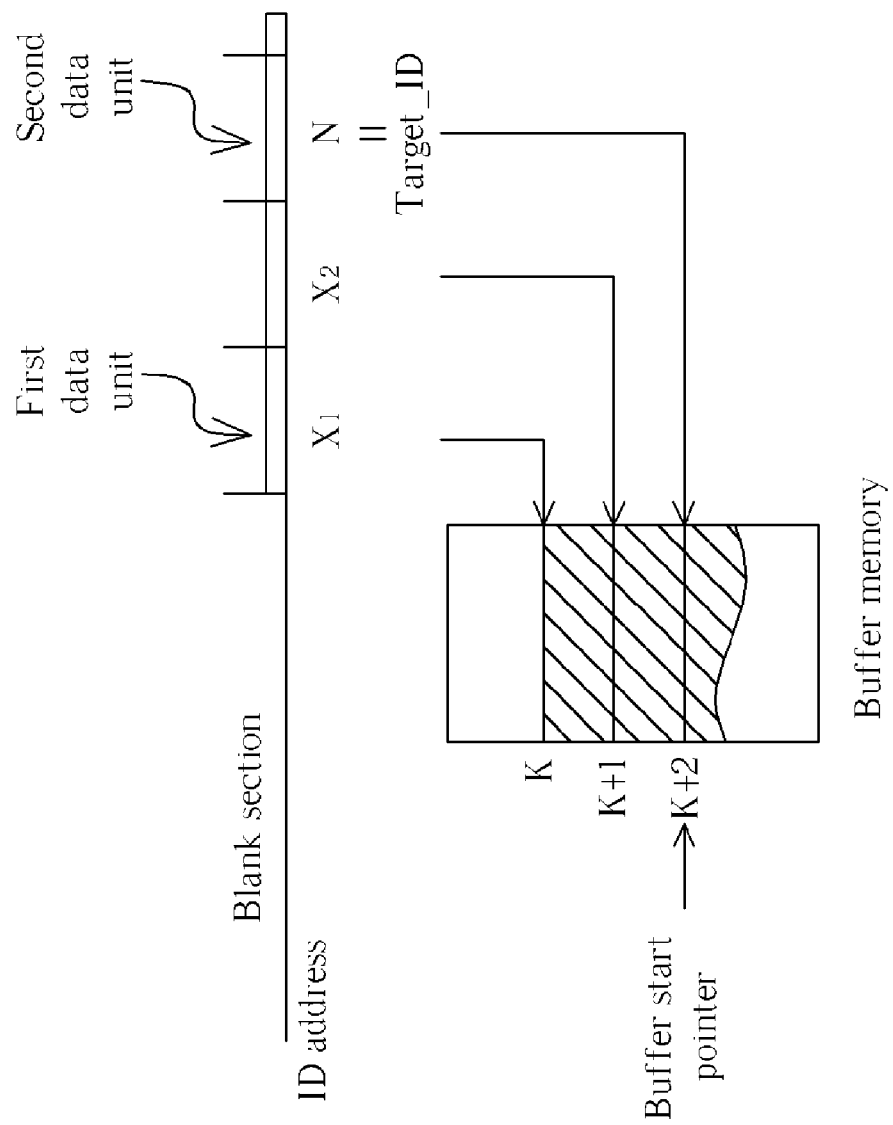
Figure 7:
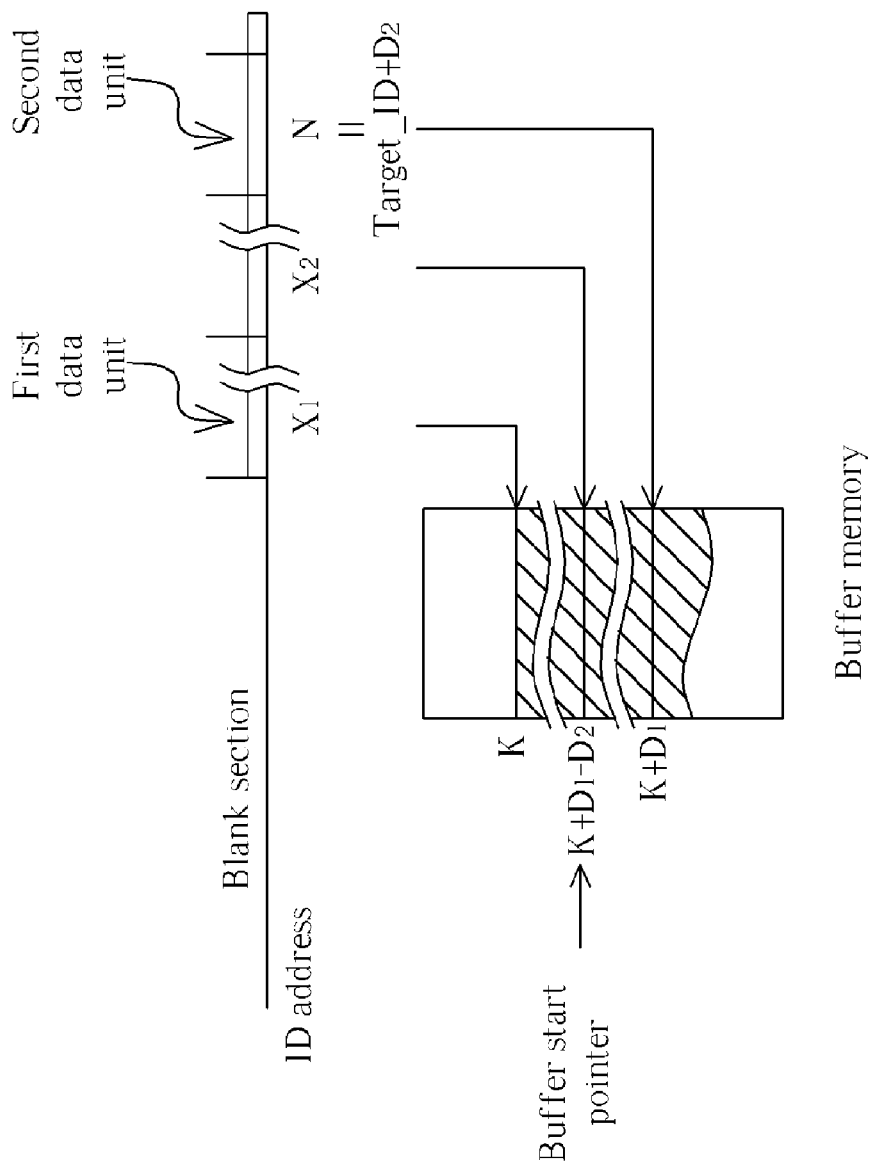

In the following paragraphs specific examples will be introduced to further illustrate the flowchart shown in FIG. 4. FIG. 5~FIG. 7 are schematic diagrams illustrating how the optical disc drive applies the method shown in FIG. 4. In each of these figures, the optical disc drive tries to buffer a data unit having an ID address matching a target ID address Target_ID and subsequently reproduced data units into the buffer memory in turn. The data unit with ID address that matches the target ID address is referred to as a target data unit.

As is shown in FIG. 5, the optical disc drive reproduces a first data unit with an unidentifiable ID address represented by X immediately after a blank section is passed. Since the first data unit is immediately behind the blank section, the optical disc drive is not able to deduce the first data unit's ID address at once. Therefore, the optical disc drive is not able to conclude that X=N=Target_ID and find out that the first data unit should be treated as the target data unit. According to the flowchart shown in FIG. 4, however, the optical disc drive can still start storing the first data unit and subsequently reproduced data units into the buffer memory even though the ID address of the first data unit remains unknown. While subsequently reproduced data units are stored into the buffer memory in turn, the optical disc drive keeps on trying to identify the ID address of each reproduced data unit. After the optical disc drive has found that a second data unit has an ID address N+1, it can infer which of the already buffered data units is the target data unit having an ID address that matches the target ID address Target_ID. More specifically, in this example the optical disc drive subtracts Target_ID from N+1 to obtain an ID address difference Add_Diff. Since in this example Target_ID=N, therefore Add_Diff=1. The optical disc drive then gets a product of the ID address difference Add_Diff and a unit memory address length and subtracts the product from a second memory address K+1, which represents where the second data unit is stored in the buffer memory, to obtain the target memory address. The target memory address represents where the target data unit is stored in the buffer memory. After the above calculations, the optical disc drive finds that the target memory address is K, therefore it sets a buffer start pointer as K. Please note that even though the optical disc drive does not know the ID address of the first data unit, it still treats the first data unit as a starting point and starts storing the first data unit and subsequently reproduced data units into the buffer memory. Then, setting the buffer start pointer as K allows the optical disc drive or an external host to correctly utilize the data stored in the buffer memory.

As is shown in FIG. 6, the optical disc drive reproduces a first data unit with an unidentifiable ID address represented as $X_1$ immediately after a blank section is passed. Since the first data unit is immediately behind the blank section, the optical disc drive is not able to deduce the first data unit's ID address at once. Therefore, the optical disc drive cannot instantly conclude which data unit should be treated as the target data unit. According to the flowchart shown in FIG. 4, however, the optical disc drive can still start storing the first data unit and subsequently reproduced data units into the buffer memory even though the ID address of the first data unit remains unknown. While subsequently reproduced data units are stored into the buffer memory in turn, the optical disc drive keeps on trying to identify the ID address of each reproduced data unit. After the optical disc drive has identified that a second data unit has an ID address N, it can infer which of the already buffered data units is the target data unit having an ID address matching the target ID address Target_ID. More specifically, in this example N equals Target_ID and a second memory address represents where the second data unit is stored in the buffer memory equals K+2. The target memory address calculated by the optical disc drive will be equal to K+2. Therefore the optical disc drive finds that the second data unit is the target data unit and sets a buffer start pointer as K+2. Data units stored in memory addresses ahead of the buffer start pointer K+2, including memory addresses K and K+1, can be neglected.

FIG. 7 shows an example in a broader sense. As is shown in FIG. 7, the optical disc drive reproduces a first data unit with an unidentifiable ID address represented by $X_1$ immediately after a blank section is passed. Since the first data unit is immediately behind the blank section, the optical disc drive is not able to deduce the first data unit's ID address at once. Therefore, the optical disc drive cannot instantly conclude which data unit should be treated as the target data unit. According to the flowchart shown in FIG. 4, however, the optical disc drive can still start storing the first data unit and subsequently reproduced data units into the buffer memory even though the ID address of the first data unit remains unknown. While reproduced data units are stored into the buffer memory in turn, the optical disc drive keeps on trying to identify the ID address of each reproduced data unit. After the optical disc drive has identified that a second data unit has an ID address N, it can infer which of the already buffered data units is the target data unit having an ID address matching the target ID address Target_ID. More specifically, in this example N equals Target_ID+$D_2$, a second memory address representing where the second data unit is stored in the buffer memory equals K+$D_1$, and an ID address difference between the second ID address and the target ID address equals $D_2$. After proper calculations, the optical disc drive concludes that the target memory address equals K+$D_1$−$D_2$ and sets a buffer start pointer as K+$D_1$−$D_2$. Data units stored in memory addresses ahead of the buffer start pointer $K+D_1-D_2$, ranging from K to $K+D_1-D_2-1$, can be neglected.

In the above-mentioned examples, the deduced target memory address is higher than the first memory address where the first data unit is stored in the buffer memory. In other words, the target data unit is indeed stored in the buffer memory. However, if the deduced target memory address is lower than the first memory address, the optical disc drive will not be able to find the target data unit in the buffer memory since the target data unit is not stored in the buffer memory. Some remedial procedures can be provided to allow the optical disc drive to generate the missing data units without performing the read operation all over again. In the following paragraphs, it is assumed that the first and second data units are stored in a first memory address K and a second memory address $K_2$ respectively. Subtracting an inferred target memory address TA from the first memory address K an overlap value OL larger than zero is obtained.

If a first memory section with memory addresses higher than or equal to the target memory address TA and lower than the first memory address K is not occupied by other useful information and the amount of missing data units can be covered by the error correction capability of the optical disc drive, the optical disc drive simply marks the missing data units as erasure and generates these missing data units through an error correction procedure. The data units generated through the error correction procedure are then stored into the first memory section of the buffer memory.

Figure 8:
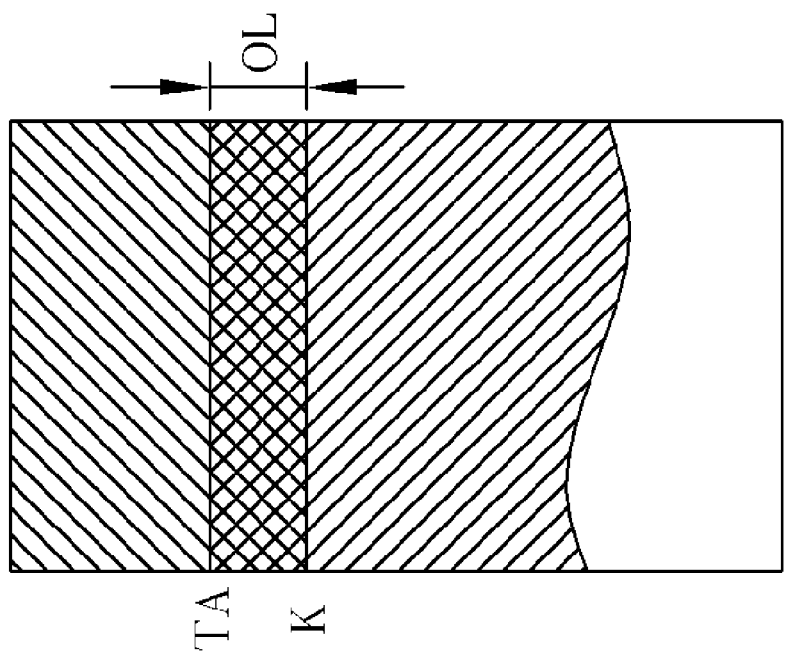

If, on the other hand, the first memory section of the buffer memory is already occupied by other useful information and has an overlap length OL, as shown in FIG. 8, the optical disc drive should prevent the information stored in the first memory section from being overlaid. In such circumstances, the optical disc drive can perform one of the following three proposed remedial procedures.

Figure 9:
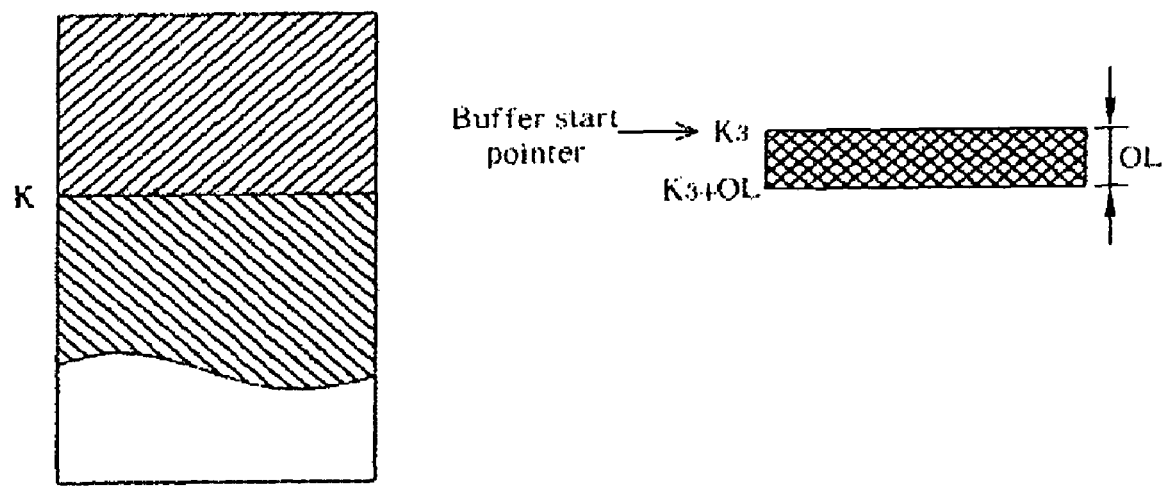

In a first remedial procedure to prevent the information stored in the first memory section from being overlaid, after the optical disc drive has identified the ID address of the second data unit and deduced the target memory address TA, which is lower than K, it allocates a third memory section to store the missing data units. As shown in FIG. 9, the third memory section has memory addresses that lie between $K_3$ and $K_3+OL$. If the amount of missing data units can be covered by the error correction capability of the optical disc drive, it simply marks the missing data units as erasure and generates these missing data units through an error correction procedure. The data units generated through the error correction procedure are then stored into the third memory section of the buffer memory. In these circumstances, the reproduced data units will be discontinuously stored in the buffer memory. More specifically, a first part of the reproduced data units are stored in the third memory section, while a second part of the reproduced data units are stored in addresses higher than K. The optical disc drive can set the buffer start pointer as $K_3$ and additionally notes that the sequence of the data units stored in the third memory section is immediately ahead of the first memory address K.

Figure 10:
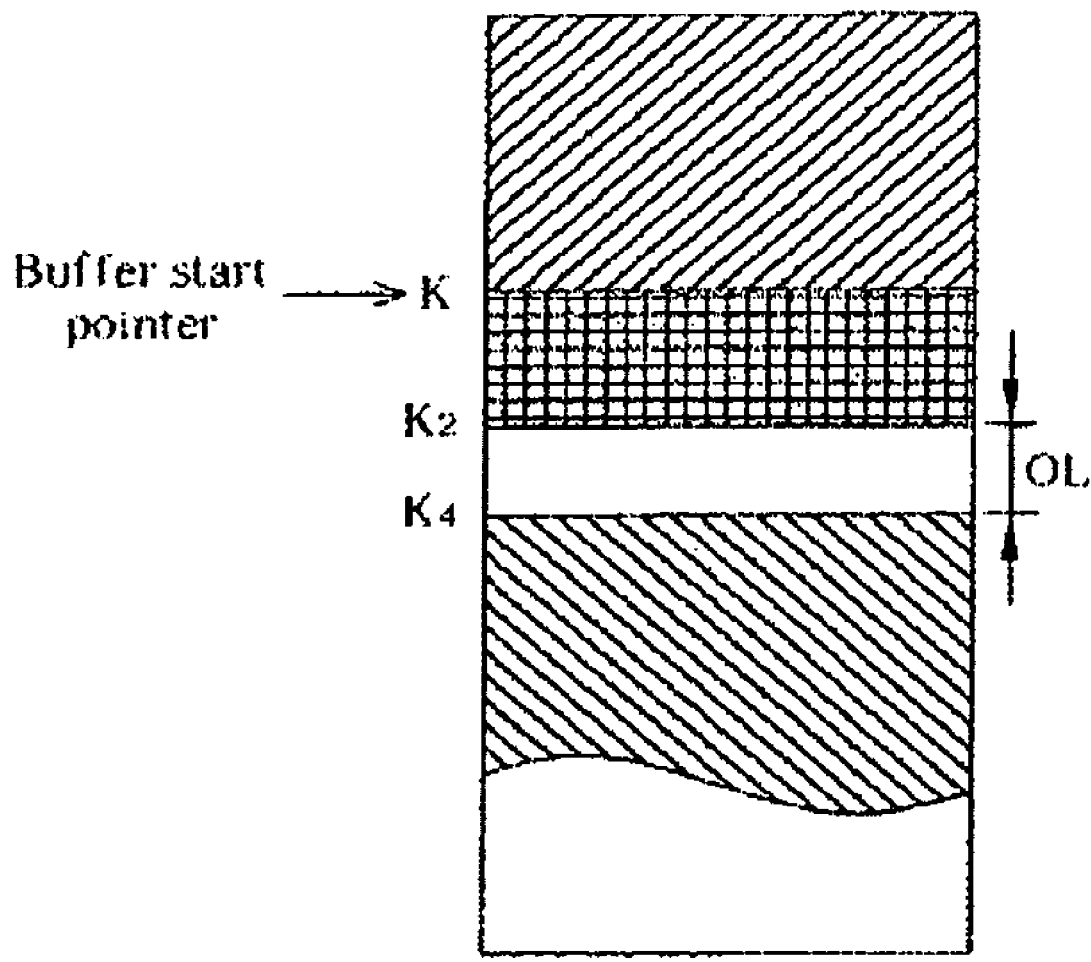

Using the above-mentioned remedial procedure, the reproduced data units are discontinuously stored in the buffer memory. This is not a problem if one of the remaining two remedial procedures is performed. In the second remedial procedure, after the optical disc drive has identified the ID address of the second data unit and deduced the target memory address TA, as shown in FIG. 10, it stores the second data unit into a fourth memory address $K_4$ and subsequently reproduced data units into subsequent memory addresses. The fourth memory address $K_4$ equals $K_2+OL$. If the missing data units and those data units originally stored between memory address K and $K_2$ can be covered by the error correction capability of the optical disc drive, the optical disc drive directly marks these data units as erasure and performs an error correction procedure to generate these data units. The data units generated through the error correction procedure are then stored back into the second memory section of the buffer memory, where the memory addresses of the second memory section are higher than or equal to the first memory address K and lower than the fourth memory address $K_4$. Since the reproduced data units are continuously stored in the buffer memory, the optical disc drive can simply set the buffer start pointer as K and allow continuous data access in the buffer memory.

Figure 11:
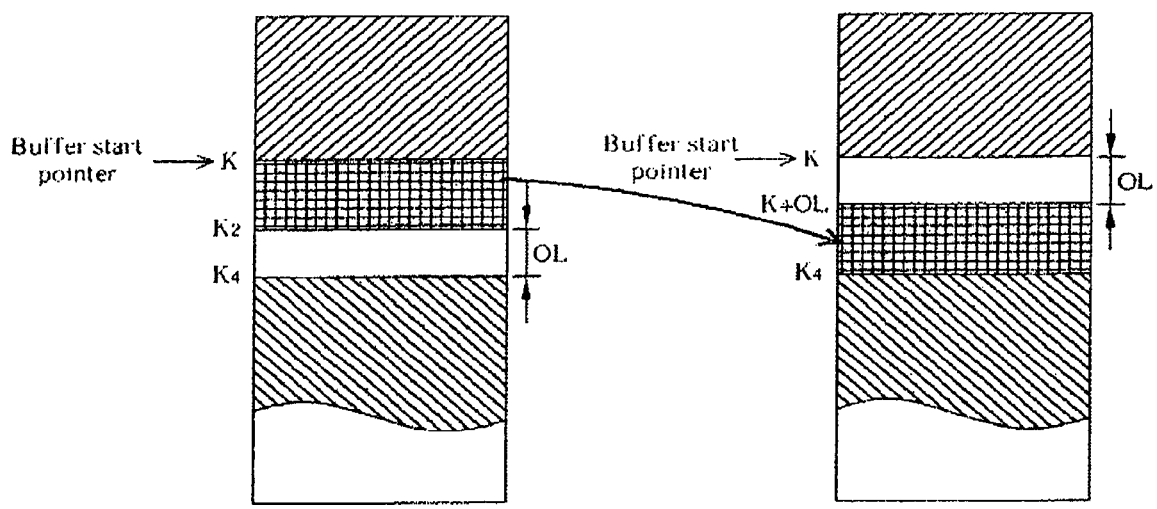

The third remedial procedure is similar to the second one. The difference is that in the third remedial procedure, as shown in FIG. 11, the optical disc drive moves data units originally stored in a third memory section to a fourth memory section. The memory addresses of the third memory section are higher than or equal to K and lower than $K_2$, and the memory addresses of the fourth memory section are higher than or equal to K+OL and lower than $K_4$. Fewer data units are then generated through the error correction procedure. In other words, only the missing data units that are not reproduced in the read operation need to be generated through the error correction procedure. The optical disc drive only marks these missing data units as erasure and performs the error correction procedure to generate them and stores them into the above-mentioned third memory section. The optical disc drive can still set the buffer start pointer as K and allow continuous data access in the buffer memory.

In the embodiments, even if a reproduced data unit has an unidentifiable and temporarily undeducible ID address, the optical disc drive can still start storing the data unit and subsequently reproduced data units into the buffer memory. Therefore the optical disc drive misses less data units that should be buffered when it reproduce those data units for the first time. The performance of the optical disc drive is therefore upgraded.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data buffering method utilized when performing a read operation on an optical storage medium, the method comprising:

after a first identification (ID) address of a first data unit reproduced through performing the read operation on the optical storage medium is unidentifiable or temporarily undeducible, starting storing the first data unit and subsequently reproduced data units into a buffer memory in turn;

after a second ID address of a second data unit of the subsequently reproduced data units is identified, deducing a target memory address of the buffer memory according to the second ID address and a target ID address, the target memory address corresponding to the target ID address; and setting a buffer start pointer according to the target memory address;

wherein ID addresses originally possessed by the first data unit and the second data unit on the optical storage medium are different from each other.

2. The method of claim 1, wherein when storing the first data unit and the subsequently reproduced data units into the buffer memory in turn, the second data unit is stored in a second memory address of the buffer memory, and the step of deducing the target memory address comprises:

obtaining an ID address difference between the target ID address and the second ID address; and subtracting a memory address difference corresponding to the ID address difference from the second memory address to obtain the target memory address.

3. The method of claim 1, wherein when storing the first data unit and the subsequently reproduced data units into the buffer memory in turn, the first and second data units are stored in a first and a second memory address of the buffer memory respectively, and the method further comprises:

if the obtained target memory address is lower than the first memory address, performing an error correction procedure to reproduce at least one missing data unit ahead of the first data unit, and storing the at least one missing data unit into a first memory section of the buffer memory;

wherein the memory addresses of the first memory section are higher than or equal to the target memory address and lower than the first memory address.

4. The method of claim 1, wherein when storing the first data unit and the subsequently reproduced data units into the buffer memory in turn, the first and second data units are stored in a first and a second memory address of the buffer memory respectively, and the method further comprises:

if the target memory address is lower than the first memory address, performing an error correction procedure to reproduce at least one missing data unit ahead of the first data unit, and storing the at least one missing data unit into a third memory section of the buffer memory;

wherein the third memory section is not stored with useful information before the at least one missing data unit is stored.

5. The method of claim 1, wherein when storing the first data unit and the subsequently reproduced data units into the buffer memory in turn, the first and second data units are stored in a first and a second memory address of the buffer memory respectively, and the method further comprises:

if an overlap value generated through subtracting the target memory address from the first memory address is larger than zero, storing the second data unit and data units behind the second data unit into the buffer memory starting with a third memory address in turn; and performing an error correction procedure to reproduce at least one data unit ahead of the second data unit, and storing the at least one data unit into a second memory section of the buffer memory;

wherein the third memory address is equal to the sum of the second memory address and the overlap value, and the memory addresses of the second memory section are higher than or equal to the first memory address and lower than the third memory address.

6. The method of claim 1, wherein when storing the first data unit and the subsequently reproduced data units into the buffer memory in turn, the first and second data units are stored in a first and a second memory address of the buffer memory respectively, and the method further comprises:

if an overlap value generated through subtracting the target memory address from the first memory address is larger than zero, storing the second data unit and data units behind the second data unit into the buffer memory starting from a third memory address in turn;

moving the data units stored in a third memory section of the buffer memory to a fourth memory section of the buffer memory; and performing an error correction procedure to reproduce at least one missing data unit ahead of the first data unit, and storing the at least one missing data unit into a fifth memory section of the buffer memory;

wherein the third memory address is equal to the sum of the second memory address and the overlap value, the memory addresses of the third memory section are higher than or equal to the first memory address and lower than the second memory address, the memory addresses of the fourth memory section are higher than or equal to the sum of the first memory address and the overlap value and lower than the third memory address, and the memory addresses of fifth memory section are higher than or equal to the first memory address and lower than the sum of the first memory address and the overlap value.

7. The method of claim 1, wherein the first data unit is a first generated data unit after a blank section is passed when performing the read operation on the optical storage medium.

8. The method of claim 1, wherein the optical storage medium is an optical disc.

9. The method of claim 8, wherein the optical disc is a blu-ray disc.

10. The method of claim 1, wherein the buffer memory is a dynamic random access memory (DRAM).

11. An apparatus comprising:

a buffer memory; and an optical disc drive, for performing a read operation on an optical storage medium, wherein after a first identification (ID) address of a first data unit reproduced by the optical disc drive through performing the read operation on the optical storage medium is unidentifiable or temporarily undeducible to the optical disc drive, the optical disc drive starts storing the first data unit and subsequently reproduced data units read by the optical disc drive into the buffer memory in turn;

after a second ID address of a second data unit of the subsequently reproduced data units is identified by the optical disc drive, the optical disc drive deduces a target memory address of the buffer memory according to the second ID address and a target ID address, the target memory address corresponding to the target ID address; and the optical disc drive further sets a buffer start pointer according to the target memory address;

wherein ID addresses originally possessed by the first data unit and the second data unit on the optical storage medium are different from each other.

12. The apparatus of claim 11, wherein when storing the first data unit and the subsequently reproduced data units into the buffer memory in turn, the optical disc drive stores the second data unit in a second memory address of the buffer memory; and the optical disc drive deduces the target memory address by:

obtaining an ID address difference between the target ID address and the second ID address; and subtracting a memory address difference corresponding to the ID address difference from the second memory address to obtain the target memory address.

13. The apparatus of claim 11, wherein when storing the first data unit and the subsequently reproduced data units into the buffer memory in turn, the optical disc drive stores the first and second data units in a first and a second memory address of the buffer memory respectively; and if the obtained target memory address is lower than the first memory address, the optical disc drive further performs an error correction procedure to reproduce at least one missing data unit ahead of the first data unit, and stores the at least one missing data unit into a first memory section of the buffer memory, where the memory addresses of the first memory section are higher than or equal to the target memory address and lower than the first memory address.

14. The apparatus of claim 11, wherein when storing the first data unit and the subsequently reproduced data units into the buffer memory in turn, the optical disc drive stores the first and second data units in a first and a second memory address of the buffer memory respectively; and if the target memory address is lower than the first memory address, the optical disc drive further performs an error correction procedure to reproduce at least one missing data unit ahead of the first data unit, and stores the at least one missing data unit into a third memory section of the buffer memory, where the third memory section is not stored with useful information before the at least one missing data unit is stored.

15. The apparatus of claim 11, wherein when storing the first data unit and the subsequently reproduced data units into the buffer memory in turn, the optical disc drive stores the first and second data units in a first and a second memory address of the buffer memory respectively; the optical disc drive further stores the second data unit and data units behind the second data unit into the buffer memory starting with a third memory address in turn if an overlap value generated through subtracting the target memory address from the first memory address is larger than zero, performs an error correction procedure to reproduce at least one data unit ahead of the second data unit, and stores the at least one data unit into a second memory section of the buffer memory, where the third memory address is equal to the sum of the second memory address and the overlap value, and the memory addresses of the second memory section are higher than or equal to the first memory address and lower than the third memory address.

16. The apparatus of claim 11, wherein when storing the first data unit and the subsequently reproduced data units into the buffer memory in turn, the optical disc drive stores the first and second data units in a first and a second memory address of the buffer memory respectively; the optical disc drive further stores the second data unit and data units behind the second data unit into the buffer memory starting from a third memory address in turn if an overlap value generated through subtracting the target memory address from the first memory address is larger than zero, moves the data units stored in a third memory section of the buffer memory to a fourth memory section of the buffer memory, performs an error correction procedure to reproduce at least one missing data unit ahead of the first data unit, and stores the at least one missing data unit into a fifth memory section of the buffer memory, where the third memory address is equal to the sum of the second memory address and the overlap value, the memory addresses of the third memory section are higher than or equal to the first memory address and lower than the second memory address, the memory addresses of the fourth memory section are higher than or equal to the sum of the first memory address and the overlap value and lower than the third memory address, and the memory addresses of fifth memory section are higher than or equal to the first memory address and lower than the sum of the first memory address and the overlap value.

17. The apparatus of claim 11, wherein the first data unit is a first generated data unit after a blank section is passed when the optical disc drive performs the read operation on the optical storage medium.

18. The apparatus of claim 11, wherein the optical storage medium is an optical disc.

19. The apparatus of claim 18, wherein the optical disc is a blu-ray disc.

20. The apparatus of claim 11, wherein the buffer memory is a dynamic random access memory (DRAM).

* * * * *